(12) United States Patent
Kotaba et al.

(10) Patent No.: US 9,097,532 B2
(45) Date of Patent: Aug. 4, 2015

(54) SYSTEMS AND METHODS FOR MONOCULAR AIRBORNE OBJECT DETECTION

(75) Inventors: Ondrej Kotaba, Orlova (CZ); Jan Lukas, Melnik (CZ); Milan Sopata, Cana (SK)

(73) Assignee: Honeywell International Inc., Morristown, NJ (US)

( * ) Notice: Subject to any disclaimer, the term of this patent is extended or adjusted under 35 U.S.C. 154(b) by 424 days.

(21) Appl. No.: 12/690,450

(22) Filed: Jan. 20, 2010

(65) Prior Publication Data

US 2011/0178658 A1    Jul. 21, 2011

(51) Int. Cl.
G01C 11/06    (2006.01)
G01C 21/16    (2006.01)
G01C 21/00    (2006.01)
G06T 7/20     (2006.01)
G06T 7/00     (2006.01)
G05D 1/08     (2006.01)
(Continued)

(52) U.S. Cl.
CPC .............. G01C 21/005 (2013.01); G01C 11/06 (2013.01); G01C 21/165 (2013.01); G06T 7/0071 (2013.01); G06T 7/2053 (2013.01); G06T 2207/10032 (2013.01); G06T 2207/30232 (2013.01); G08G 5/0078 (2013.01); G08G 5/045 (2013.01)

(58) Field of Classification Search
CPC .... G01C 11/06; G01C 21/005; G01C 21/165; G06K 9/3241; G06R 2207/30241; G06T 7/0071; G06T 7/2053; G06T 7/2086; G08G 5/045

USPC .......... 382/106–107, 153–154; 701/500–512, 701/514, 519, 523, 530
See application file for complete search history.

(56) References Cited

U.S. PATENT DOCUMENTS 5,257,209 A * 10/1993 Markandey ........................ 701/1
5,422,828 A *  6/1995 Choate et al. ................. 342/458
(Continued)

FOREIGN PATENT DOCUMENTS

EP    2037408    3/2009
WO   0104055    1/2001

OTHER PUBLICATIONS

Zhu, et al. "Precise visual navigation using multi-stereo vision and landmark matching." Defense and Security Symposium. International Society for Optics and Photonics, 2007.*
(Continued)

*Primary Examiner* — Khoi Tran
*Assistant Examiner* — Dale Moyer
(74) *Attorney, Agent, or Firm* — Fogg & Powers LLC

(57) ABSTRACT

Systems and methods for airborne object detection using monocular sensors are provided. In one embodiment, a system for detecting moving objects from a mobile vehicle comprises: an imaging camera; a navigation unit including at least an inertial measurement unit; and a computer system coupled to the image camera and the navigation unit. The computer system executes an airborne object detection process algorithm, and calculates a transformation between two or more image frames captured by the imaging camera using navigation information associated with each of the two or more image frames to generate a motion compensated background image sequence. The computer system detects moving objects from the motion compensated background image sequence.

19 Claims, 6 Drawing Sheets

(51) Int. Cl.
  *G05D 1/10* (2006.01)
  *G08G 5/00* (2006.01)
  *G08G 5/04* (2006.01)

(56) References Cited

U.S. PATENT DOCUMENTS

| | | | | |
|---|---|---|---|---|
| 5,579,444 | A | * | 11/1996 | Dalziel et al. ............... 700/259 |
| 5,719,773 | A | * | 2/1998 | Choate ............................ 701/514 |
| 6,307,959 | B1 | * | 10/2001 | Mandelbaum et al. ....... 382/154 |
| 6,668,082 | B1 | | 12/2003 | Davison et al. |
| 6,999,612 | B1 | * | 2/2006 | Oliensis ......................... 382/154 |
| 7,233,691 | B2 | * | 6/2007 | Setterholm .................... 382/154 |
| 2007/0210953 | A1 | | 9/2007 | Abraham et al. |
| 2008/0089556 | A1 | | 4/2008 | Salgian et al. |
| 2008/0278569 | A1 | | 11/2008 | Rotem et al. |
| 2009/0102630 | A1 | * | 4/2009 | Nordlund ...................... 340/436 |
| 2009/0225300 | A1 | * | 9/2009 | Barrows et al. .............. 356/28.5 |

OTHER PUBLICATIONS

Byrne et al., "Expansion Segmentation for Visual Collision Detection and Estimation", "2009 IEEE International Conference on Robotics and Automation", May 12-17, 2009.

Carnie et al., "Image Processing Algorithms for UAV 'Sense and Avoid'", "Proceedings of the 2006 IEEE Conference on Robotics and Automation", May 2006, pp. 2848-2853, Published in: Orlando, Florida.

Griffiths et al., "Obstacle and Terrain Avoidance for Miniature Aerial Vehicles", "IEEE Robotics and Automation Magazine", 2006.

Kephart, "Comparision of See-and-Avoid Performance in Manned and Remotely Piloted Aircraft", Nov. 2008, Publisher: Russ college of Engineering and Technology of Ohio University.

Labrie et al., "Efficient Camera Motion and 3D Recovery Using an Inertial Sensor", "Fourth Canadian Conference on Computer and Robot Vision", May 28-30, 2007.

McCalmont et al., "Sense and Avoid Technology for Global Hawk and Predator UAVS", "Infrared Technology and Applications XXXI", May 31, 2005, pp. 684-692, vol. 5783, Publisher: Proc. of SPIE, Published in: Bellingham, WA.

McCandless, "Detection of Aircraft in Video Sequences Using a Predictive Optical Flow Algorithm", 1999, Publisher: Optical Engineering.

McGee et al., "Obstacle Detection for Small Autonomous Aircraft Using Sky Segmentation", 2005, Publisher: AINS Center for Collaborative Control of Unmanned Vehicles, Published in: University of California, Berkeley.

Sheikh et al., "On the Direct Estimation of Fundamental Matrix", "IEEE Conference on Computer Vision and Pattern Recognition 2007", Jun. 17-22, 2007.

Singh et al., "Motion Estimation by Optical Flow and Inertial Measurements for Dynamic Legged Locomotion", 2005, Publisher: Robotics Locomotion Laboratory, Stanford University.

Utt et al., "Development of a Sense and Avoid System", Sep. 26-29, 2005, Publisher: American Institute of Aeronautics and Astronautics, Published in: Arlington, Virginia.

European Patent Office, "Office Action from EP Application No. 11150272.0 mailed Apr. 8, 2014", "from Foreign Counterpart of U.S. Appl. No. 12/690,450", Apr. 8, 2014, pp. 1-7, Published in: EP.

European Patent Office, "European Search Report from EP Application No. 11150272.0 mailed Mar. 10, 2014", "from Foreign Counterpart of U.S. Appl. No. 12/690,450", Mar. 10, 2014, pp. 1-3, Published in: EP.

\* cited by examiner

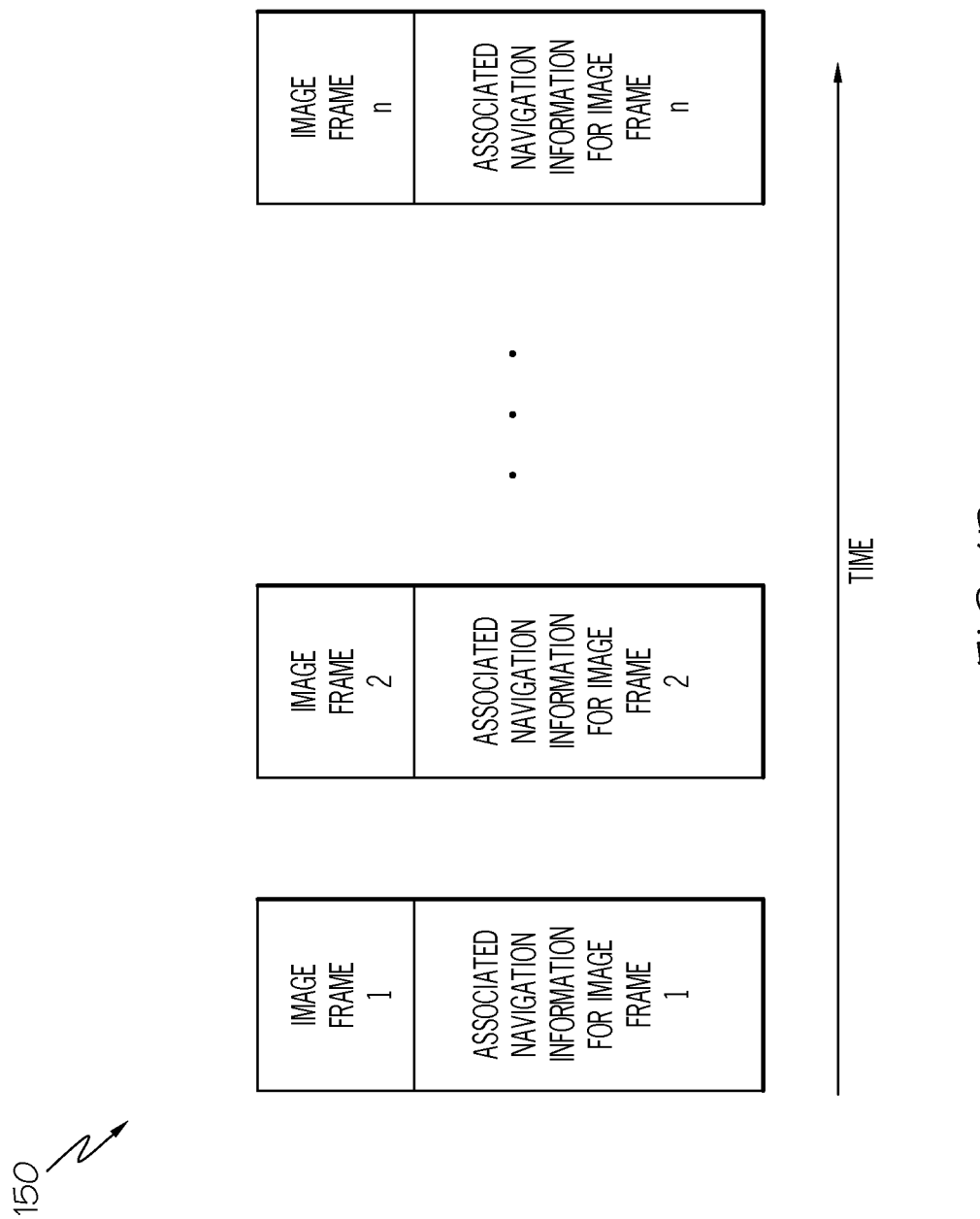

SYSTEMS AND METHODS FOR MONOCULAR AIRBORNE OBJECT DETECTION

BACKGROUND

Unmanned automated vehicles (UAV's) need to sense and avoid the presence and locations of obstacles in order to safely navigate paths to complete their missions. Airborne UAV's further have the need to detect other airborne objects from their surrounding environments. Power and weight constraints, however, limit what sensing technologies may be employed in airborne UAV's. Stereoscopic image processing requires duplicity of image sensors in order to capture images that may be used to determine a range of an airborne object. In addition, in many applications, the required separation of the image sensors for a desired depth resolution using stereoscopic images exceeds the available dimensions (for example, wingspans). Single sensor technologies, such as Radar, Lidar and millimeter wave radar (as well as the power sources required to power such equipment) are typically too heavy for use in lightweight airborne UAV designs.

For the reasons stated above and for other reasons stated below which will become apparent to those skilled in the art upon reading and understanding the specification, there is a need in the art for improved systems and methods for airborne object detection using monocular sensors.

SUMMARY

The Embodiments of the present invention provide methods and systems for monocular airborne object detection and will be understood by reading and studying the following specification.

In one embodiment, a system for detecting moving objects from a mobile vehicle comprises: an imaging camera; a navigation unit including at least an inertial measurement unit; and a computer system coupled to the image camera and the navigation unit. The computer system executes an airborne object detection process algorithm, and calculates a transformation between two or more image frames captured by the imaging camera using navigation information associated with each of the two or more image frames to generate a motion compensated background image sequence. The computer system detects moving objects from the motion compensated background image sequence.

DRAWINGS

Embodiments of the present invention can be more easily understood and further advantages and uses thereof more readily apparent, when considered in view of the description of the preferred embodiments and the following figures in which:

FIG. 1B is a block diagram illustrating image frames and navigation information for a monocular airborne object detection system of one embodiment of the present invention;

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention address the needs of self-navigating vehicles to be able to detect both moving and static objects within their surroundings while avoiding the weight and power requirements typically associated with previously known object detection schemes. Although flying self-navigating vehicles are primarily discussed by example below, one of ordinary skill in the art reading this specification would appreciate that embodiments of the present invention are not limited to flying self-navigating vehicles. Other embodiments including land and water self-navigating vehicles are contemplated as within the scope of embodiments of the present invention, as well and as vehicles piloted remotely or by a pilot on board. Embodiments of the present invention achieve detection of moving objects (such as airborne objects, for example) by joining a plurality images captured from a vehicle mounted camera with vehicle inertial data to produce image sequences having a motion compensated background that enable the detection of moving objects. As used herein, the term "camera" is a generic term for any device that takes an image using any spectrum to which the camera is sensitive, and projecting the observed space onto a two-dimensional plane. For example, a camera, as the term is used herein, may be sensitive to all or part of the light spectrum visible to humans, or alternatively, spectrums of higher or lower frequency. Alternatively, a camera, as the term is used herein, also includes a device that produces a projection of observed space onto a two-dimensional Riemannian manifold based on a form of energy other than photonic light energy.

Figure 1A:
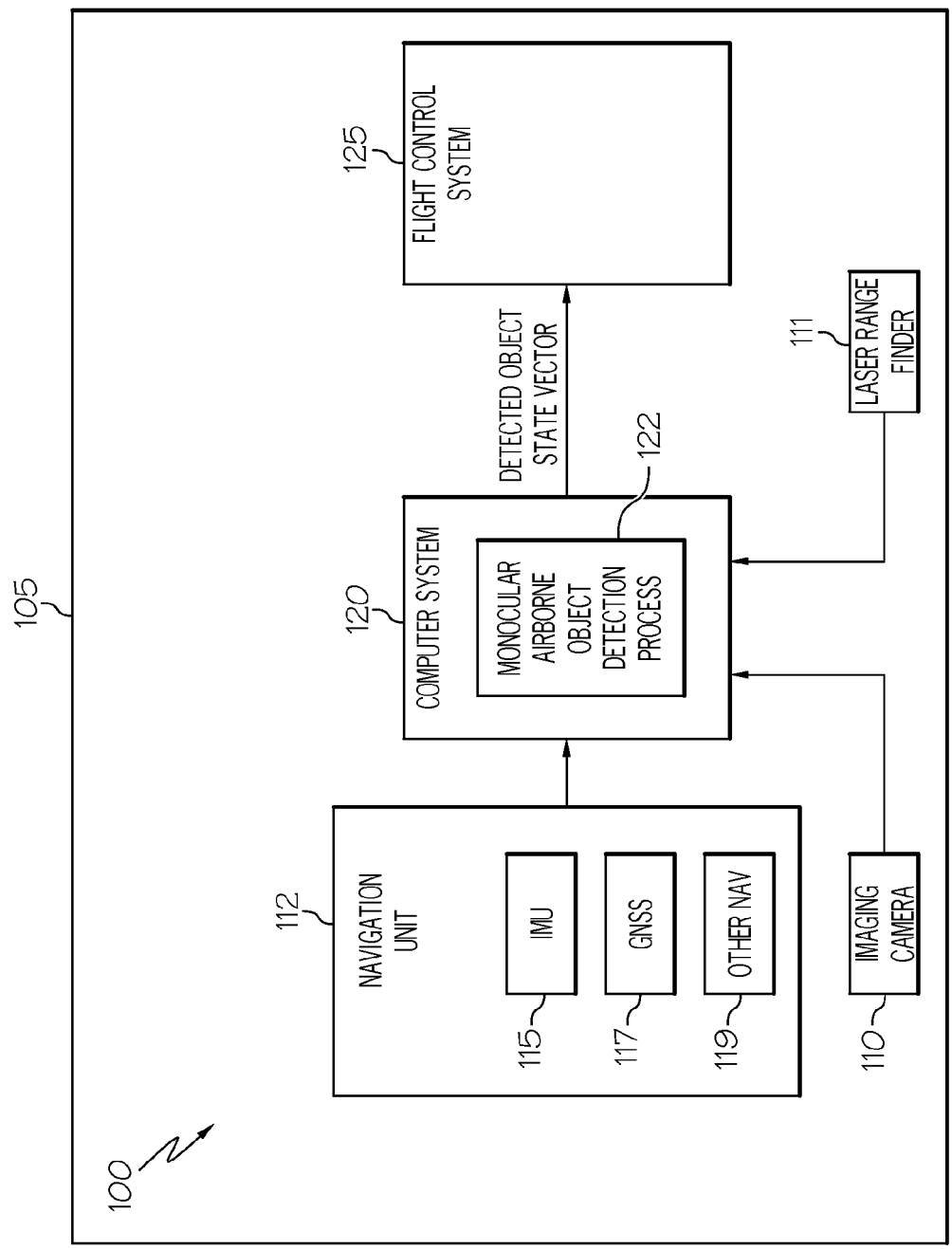
FIG. 1A is a block diagram illustrating a monocular airborne object detection system of one embodiment of the present invention.

FIG. 1A is a block diagram illustrating a system 100 for the detection of airborne objects of one embodiment of the present invention. System 100 includes an imaging camera 110, a navigation unit 112 including at least an inertial measurement unit (IMU) 115, and a computer system 120 performing an analysis of the information acquired by the imaging camera 110 and the navigation unit 112 as described below. In one embodiment, system 100 is incorporated into an unmanned automated vehicle (UAV) such as shown at 105.

In operation, imaging camera 110 captures a plurality of image frames. For each image frame captured, IMU 115 captures the inertial measurement data (i.e., accelerometer and gyroscopic data) or the associated navigation information (i.e. inertial navigation system information) for vehicle 105 at the time each frame is captured. For the purpose of this specification, both will be called "navigation information"

but it is to be understood that any type of a motion description can be used in the term used is therefore not to be taken as limiting and scope. As illustrated in FIG. 1B generally at 150, for each of the plurality of image frames (Frame 1 to Frame n), there is associated navigation information for that reference frame. Computer system 120 compensates for the movement of imaging camera 110 using data from the IMU 115 in order to generate an image referred to herein as a motion compensated background image sequence. From the motion compensated background image sequence, computer system 120 can differentiate moving objects from static background objects.

Using the navigation information from the IMU 115, computer system 120 calculates an appropriate transformation, for example in the form of a fundamental matrix. A fundamental matrix acts as a transformation matrix between any two image frames and can be calculated from the associated navigation information for the two image frames. A fundamental matrix, when applied to a first image frame, will generate an image projection representing how a scene captured by the first image frame should appear from the perspective of the camera at the point in time when the second image frame is captured, assuming that all the objects within the scene are located at the apparent affinity compared to the baseline between the camera frames. A fundamental matrix thus represents how the camera 110 has rotated between taking the first and second image frames. Embodiments of the present invention create a motion compensated background image sequence by overlapping one or more reprojected frames onto a selected one of the plurality of captured image frame. In other embodiments, the transformation is computed using an essential matrix, or quarternion math, transformation vector field, or other representation.

Figure 2A:
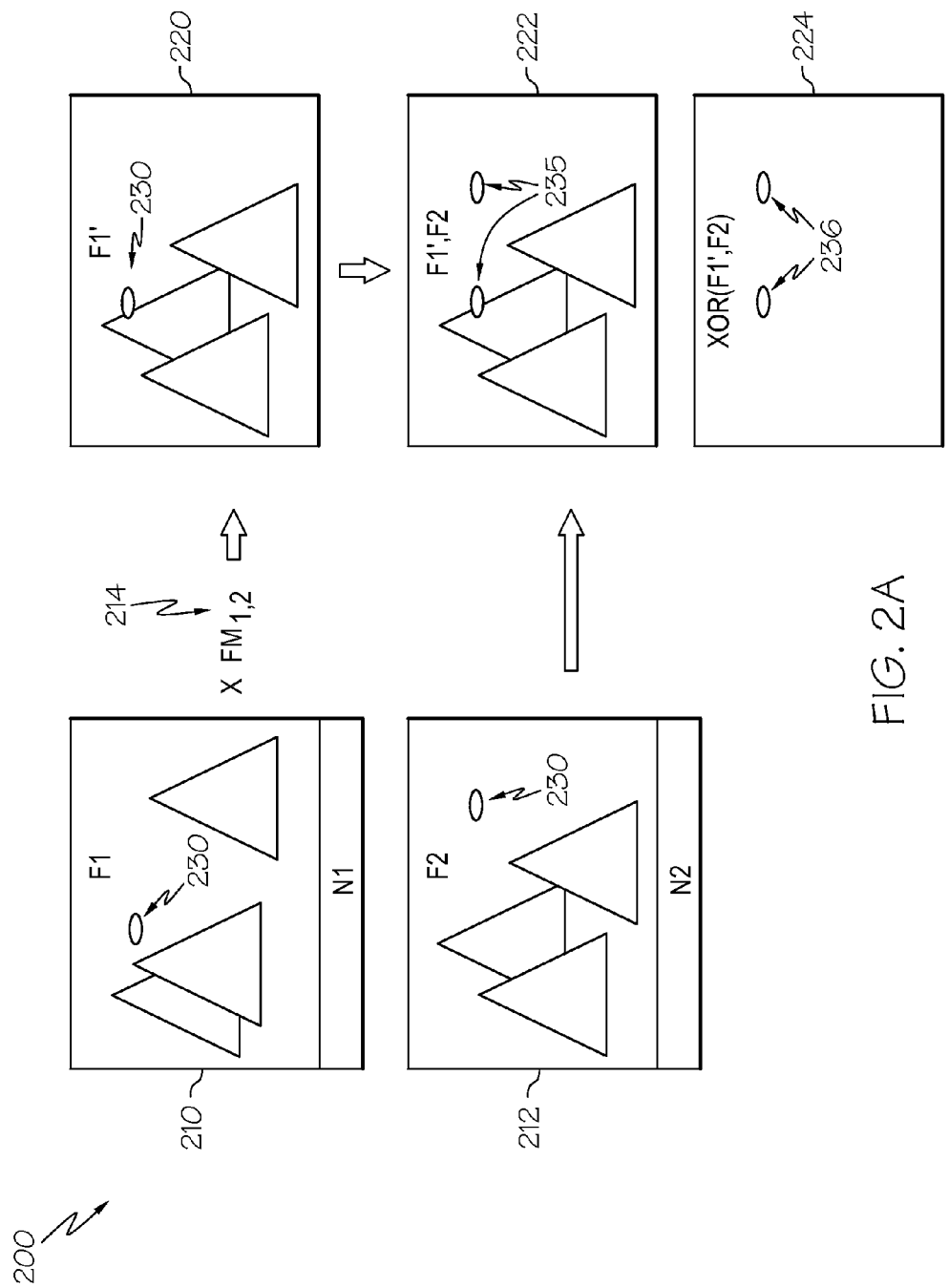
FIG. 2A is a diagram illustrating monocular airborne object detection of one embodiment of the present invention.

FIG. 2A provides an example 200 of a frame reprojection of one embodiment of the present invention for creating a motion compensated background image sequence. Camera 110 captures a first image (F1) shown generally at 210 while navigation system 112 measures associated navigation information (N1) for that point in time when F1 is captured. Camera 110 subsequently captures second image (F2) shown generally at 212 while associated navigation information (N2) is measured by navigation system 112. Fundamental Matrix $FM_{1,2}$ (shown generally at 214) is calculated from F1, N1, F2 and N2 using one of any applicable known means for calculating a fundamental matrix. For example, in one embodiment, a fundamental matrix is calculated using $F=K^{1-T}[t]_x RK^{-1}$, where $[\ ]_x$ is the matrix representation of the cross-product (a multiplication with skew-symmetric matrix), the R is the rotation matrix, t is the translation vector and K is the camera intrinsic calibration matrix. One available reference that discusses calculation of a fundamental matrix is provided by Hartley, R., and Zisserman, A., *Multiple View Geometry*, Vol. 4, Cambridge University Press, 2000, which is herein incorporated by reference. Applying $FM_{1,2}$ to the first image F1 produces F1' (shown generally at 220), a reprojection of the first image F1 as it should appear from the vantage point of camera 110 when image frame F2 was captured, provided all the objects within the scene are located at the apparent infinity. Combining the results of F1' and F2 produces the motion compensated background image sequence 222. In the motion compensated background image sequence, the reprojection of any static object in F1' should overlap with itself in F2. Every static object at a first position in the first image frame, after being transformed into the reprojection of frame one using the fundamental matrix, will end up reprojected onto itself on the second image frame as viewed in the motion compensated background image sequence, assuming that all background objects are located at an apparent infinity. A moving object or an object closer than apparent infinity (indicated generally at 230) in contrast, will instead appear at varying locations, as shown generally at 235, in the motion compensated background image sequence 222. The reprojection of an object in motion in F1' will not overlap with itself in F2. Thus an object in motion 230 in F1' appears as it would have appeared to the camera from the vantage point of F2, but at the time F1 was captured. The result is that F1' depicts the moving object 230's previous position while F2 depicts the object 230's most recent position. For this reason, when F1' and F2 are overlaid, any object in motion will appear twice. In one embodiment, objects that appear more than once in the motion compensated background image sequence are identified by calculating the difference between F1' and F2 (by using an XOR function, for example) as shown generally at 224. This will reveal objects that appear in one frame, or the other, but not both, as shown generally at 236. The result identifies features from each image frame that did not follow the transform and are therefore not static or located closer than apparent infinity.

Figure 2B:
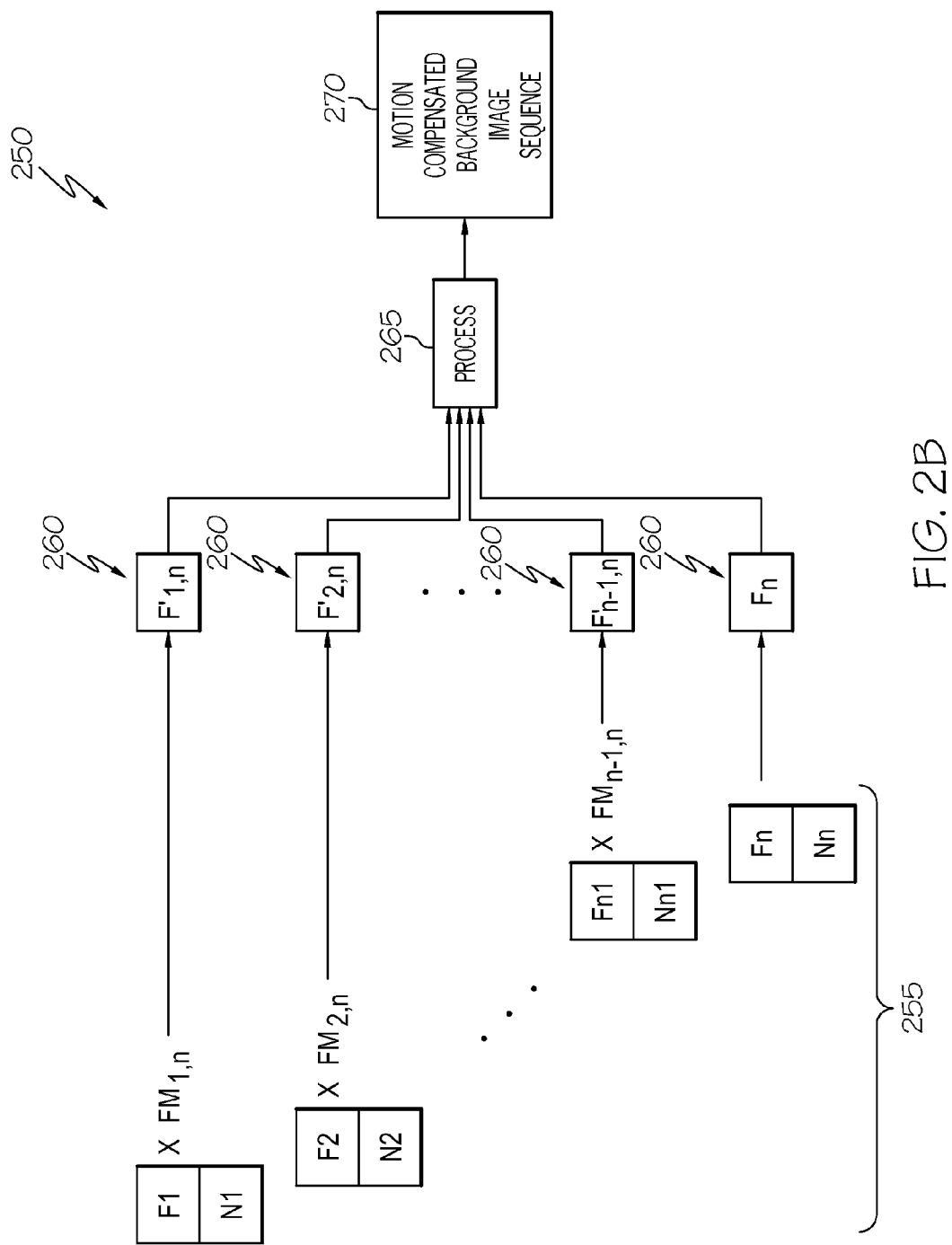
FIG. 2B is a diagram illustrating monocular airborne object detection of one embodiment of the present invention.

Although, FIG. 2A illustrates identification of objects in motion using two images, as shown in FIG. 2B, any plurality of images may be used. For example, image frames (F1 to Fn) with their associated navigation information (N1 to Nn) are captured as shown generally at 255. Using frame Fn as the target frame to be projected into, fundamental matrix $FM_{1,n}$ is calculated and reprojection $F'_{1,n}$ is generated by applying $FM_{1,n}$ to F1. In the same way frames F2 ... Fn-1 are reprojected into, $F'_{2,n} \ldots F'_{n-1,n}$. Calculation of fundamental matrices $FM_{1,n}$ to $FM_{n-1,n}$ respectively reprojects each frame into a the selected target image frame Fn. The reprojections $F'_{1,n}$ to $F'_{n-1,n}$ (shown generally at 260) and Fn (as shown at 261) are processed (shown generally at 265) to generate a motion compensated background image sequence 270. As described above, objects located at the virtual infinity (i.e. background objects) will be reprojected onto themselves. Moving objects, in contrast, will instead appear at multiple locations. Applying an bitwise subtraction or a XOR function to the set of $F'_{1,n}$ to $F'_{n-1,n}$ and Fn images allows differentiation of moving objects from static objects.

Once moving objects are identified, computer system 120 estimates a position (in 3-dimensions) for one or more of the moving objects from the captured images using a known methods, such as, but not limited to a generalized 3D-reprojection or a structure-from-motion techniques known to those of ordinary skill in the art. That is, computer system 120 not only identifies that there is an airborne moving object represented by certain pixel(s) within an image, it also determines where the moving object is located in 3-dimensional space. Structure-from motion techniques incorporate knowledge of the camera's trajectory along with the sequence of the detected objects in the camera images to calculate where the object is in 3-dimensional space, in a similar manner as stereoscopic reprojections utilize the relative distance between cameras to calculate the depth of an object. In one embodiment of the present invention, computer system 120 acquires depth information from one camera by capturing images at different times and positions with knowledge of the UAV's trajectory information. This depth information is applied to the specific airborne objects identified above to determine the relative position (i.e., with respect to the UAV's local frame of reference) of the moving objects for purposes of collision avoidance or separation assurance.

In one embodiment, navigation system 112 optionally includes a global navigation satellite system (GNSS) receiver 117 coupled to computer system 120 to further augment the trajectory information available for determining the location of detected objects. By including GNSS augmented trajectory information that identifies the UAV's trajectory as reference to a chosen reference frame (for example, global coordinates), computer system 120 can identify a moving airborne objects with respect the UAV's local frame of reference, or with respect to the navigation frame. GNSS receiver 117 augments the navigation information available to computer system 120 by providing the UAV's absolute position with respect to the navigation frame. As would be appreciated by one of ordinary skill in the art upon reading this specification, other navigation systems besides GNSS may be used to provide this information. Accordingly in one embodiment, navigation system 112 includes one or more other navigation sensors 119 to augment trajectory information available for determining the location of detected moving objects. Further, other motion estimation technologies may be used to complements the results of the navigation system 112 to consequently increase the accuracy of the solution provided by computer system 120.

In one embodiment, computer system 120 provides its solution in the form of a state vector for each detected moving object that describes at least its estimated position. When navigation system 112 provides satellite based navigation information, the state vector calculated by computer system 120 can be referenced to the global navigation frame. In one embodiment, one or more state vectors are provided to a guidance/flight control computer 125 coupled to computer system 120. Based on the information provided by the state vectors regarding the detected moving objects, guidance/flight control computer 125 can initiate evasive or mitigating adjustments to the flight course of the UAV. Optionally, the flight controller 125 can further transmit alarm messages to ground based stations or other UAV's regarding the detected moving objects. In one embodiment, computer system 120 is further programmed to track the detected airborne objects and to provide estimates of additional states, like motion velocity vector, time to collision or other states. In another embodiment, future trajectories of detected airborne objects are further extrapolated to estimate a collision probability.

As would be appreciated by one of ordinary skill in the art upon reading this specification, one of the biggest challenges for airborne object detection scheme that rely on motion detection is the detection of objects on a direct collision course with the observer. When airborne objects are both flying straight with a constant speed and on a collision course, the observation angle of the airborne object (as viewed from each of the airborne objects) does not change. Consequently, the position of the object within a motion compensated background image sequence will remain the same and thus appear to be a fixed background object rather than a moving airborne object. One clue provided from the motion compensated background image sequence is that the size of the object within the image will increase with each sequential image. However, the magnitude of this change may not be detectable in time to take action.

To address the detection of objects on a direct collision course, one embodiment of the present invention introduces an artificial trajectory excitation into the UAV flight path to achieve a slight difference in the observation perspective of sequential images captured by the camera. This excitation may include altering the linearity of the UAV's flight path using the natural modes of aircraft to motion or by varying the speed of the UAV, for example. The different observation perspectives enable establishment of a baseline (a distance that is perpendicular towards the UAV's axis of motion) which is needed to estimate the distance to the object. In one embodiment, such deviations in the UAV flight path are periodically introduced by the flight computer 125 so that computer system 120 can look for the potential presence of objects on a collision course with the UAV. In one embodiment, the frequency, amplitude, and direction of deviations is increased once a potential collision course object is identified, to establish a better baseline in the respective direction.

In some embodiments, the UAV further includes a stearable laser range finder 111. In such embodiment, once a potential collision threat is identified, the UAV may employ the stearable laser range finder to verify the existence of the detected threat and measure the distance to the detected object. In other embodiments, the objects detected using the described method are fused with detections from other sensor families (radar, transponder, etc.), to increase the integrity of the solution by taking advantage of complementary properties. In respective embodiments, this sensor fusion is based on an Extended Kalman Filter, Unscented Kalman Filter and a Particle Filter, respectively. The same filter is then used as an estimator to provide the extended motion modal states for the detected objects The descriptions above provide idealized examples where background objects are assumed to be located at virtual infinity. However, this is not an assumption that is always valid. For example, when a UAV is flying close to the ground, images of the ground captured by the camera cannot be considered to be at virtual infinity. Such deviations from the ideal situation introduce scatter into the motion compensated background image sequence. To the degree that such scatter is trivial when compared the motion of detected airborne objects of interest, it may be simply ignored as long as it does not exceed a threshold predetermined based on the mission of the UAV. Alternatively, a background closer than virtual infinity may be addressed in one of several ways.

In one embodiment, computer system 120 divides each captured image frame into smaller segments and refines the motion of that segment using the acquired visual content aided by the associated navigation information for the image. Assuming the UAV is close to the ground, as the camera moves between successive frames it will observe the background as a close and moving object. Processing a local patch of neighboring image segments and using the trajectory information (direction of translation and a rotation) computer system 120 determines which direction the background (e.g. the ground) for this patch of image segments has moved within the segments. Features in the image frame within segments that capture the ground, and appear moving at the same speed and direction as the ground in that patch, are deemed to be part of the background and not airborne objects.

Alternatively in one embodiment, computer system 120 dynamically varies the frame rate of images being captured by camera 110, and/or discards some frames. For example, in one embodiment, computer system 120 adjusts the image frame rate for camera 110 based on the speed of the UAV (which is, for example, known from information provided by INS 115) so that the background will appear to be at virtual infinity. Any object closer than the background is not at infinity and will thus be visible when reprojected into the motion compensated background image sequence. In one embodiment, the amount of clutter in the motion compensated background image sequence versus the base image frame is used as the basis for increasing or decreasing the image frame rate. For example, given two image frames and their associated navigation information, calculate a fundamental matrix. From the fundamental matrix, generate a reprojection of the first image. Then find the difference between the reprojection of the first image and the second image (by subtraction or XOR, for example). Given the amount of clutter you can discern from this difference determine if the sampling periods are short enough or not to satisfy the context of the background being at a virtual infinity. In another alternate embodiment, other scheme known to those of ordinary skill in the art, such as optical flow compensations, can be used to compensate for having static background objects closer than virtual infinity in captured image frames.

Figure 3:
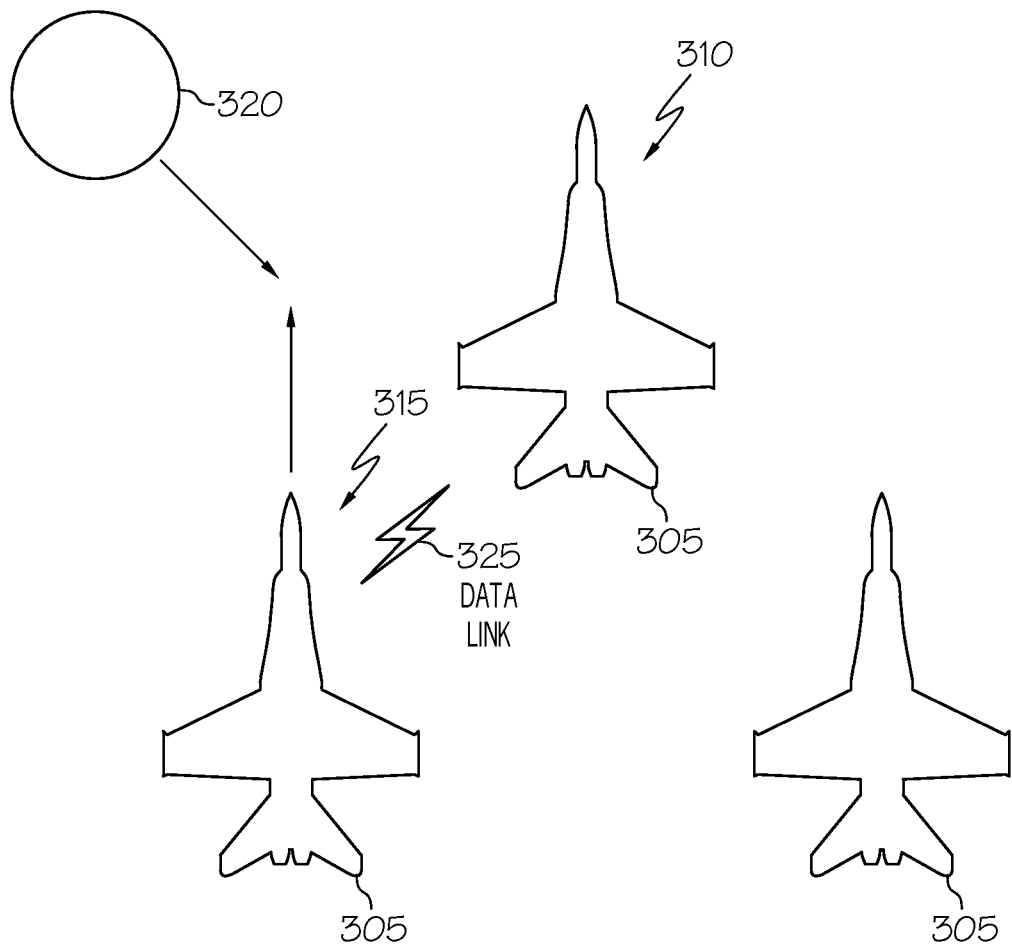
FIG. 3 is a diagram illustrating monocular airborne object detection as implemented in a plurality of unmanned automated vehicles of one embodiment of the present invention.

In one embodiment, when multiple UAV's are flying in a coordinated manner (e.g. such as in formation or in a loosely coordinated swarm) then two or more UAV's can share information via a wireless data link and use the shared information to calculate the distance to an object. FIG. 3 illustrates one such embodiment of the present invention comprising a plurality of UAV's (shown generally at 305). In one embodiment, each of the UAV's 305 are equipped with a system for the detection of airborne objects such as system 100 shown in FIG. 1. For example, in one embodiment, a first UAV 310 identifies an airborne object 320 and assigns a unique identifier to that object 320. UAV 310 then calculates a state vector for that object referenced to the global navigation frame. A second UAV 315 on a collision course with the airborne object 320 can wirelessly import that state vector available from the first UAV (shown generally by the data link at 325) to calculate its own distance to the object 320. Alternatively, in another embodiment, the second UAV 315 can import the raw image data captured by the first UAV 310, along with the navigation information associated with the image data, to calculate its own state vector for the object 320 and thus determine its distance to object 320.

Several means are available to implement the systems and methods of the current invention as discussed in this specification. These means include, but are not limited to, digital computer systems, microprocessors, general purpose computers, programmable controllers and field programmable gate arrays (FPGAs). For example, in one embodiment, computer system 120 is implemented by an FPGA or an ASIC, or an embedded processor. Therefore other embodiments of the present invention are program instructions resident on computer readable media which when implemented by such means enable them to implement embodiments of the present invention. Computer readable media include any form of a physical computer memory device. Examples of such a physical computer memory device include, but is not limited to, punch cards, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Figure 4:
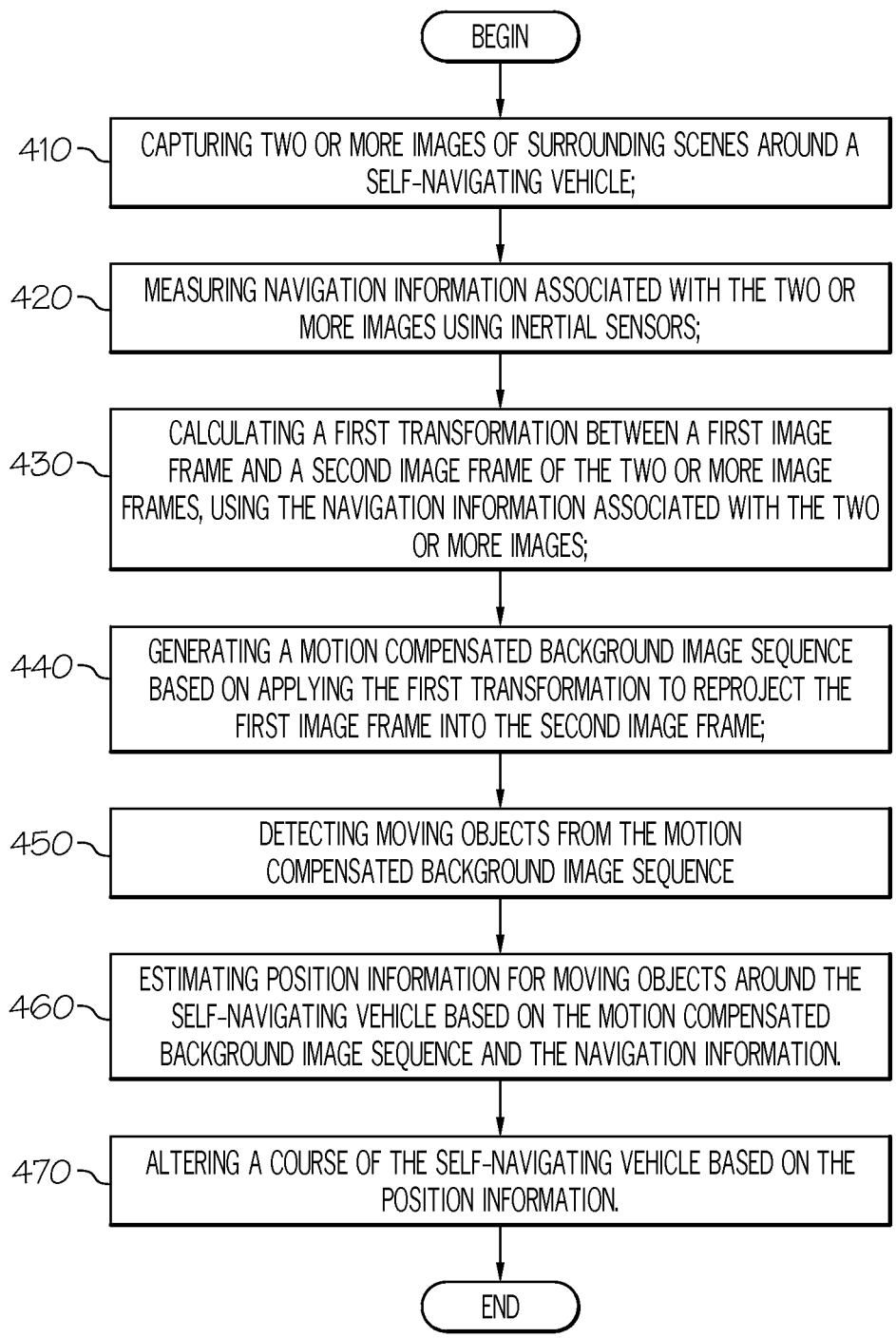
FIG. 4 is a flow chart illustrating a method for monocular airborne object detection of one embodiment of the present invention.

FIG. 4 is a flow chart for a method for image based moving object detection for storage on a computer readable media device. The method begins at 410 with capturing two or more images of surrounding scenes around a self-navigating vehicle. The method proceeds to 420 with measuring navigation information associated with the two or more images using inertial sensors. The method proceeds to 430 with calculating a first transformation (such as, for example, a fundamental matrix) between a first image frame and a second image frame of the two or more image frames, using the navigation information associated with the two or more images. A fundamental matrix acts as a transformation between any two image frames and is calculated from the associated navigation information for the two image frames. A fundamental matrix, when applied to a first image frame, will generate an image projection representing how objects located at an apparent infinity in a scene captured by the first image frame should appear from the perspective of the camera at the point in time when the second image frame is captured. A fundamental matrix thus represents how the camera 110 has rotated between taking the first and second image frames. The method proceeds to 440 with generating a motion compensated background image sequence based on applying the first transformation to reproject the first image frame into the second image frame. The method proceeds to 450 with detecting moving objects from the motion compensated background image sequence. In the motion compensated background image sequence, any static object located at apparent infinity in the first image frame should overlap with itself when reprojected onto the second image frame. That is, every static object located at apparent infinity in a first position in the first image frame, after being transformed into the reprojection of the first image frame using the fundamental matrix, will end up reprojected onto itself on the second image frame as viewed in the motion compensated background image sequence. A moving object or an object closer than apparent infinity, in contrast, will instead appear at multiple locations. The method proceeds to 460 with estimating position information for moving objects around the self-navigating vehicle based on the motion compensated background image sequence and the navigation information. In one embodiment, generalized 3D-reprojection or structure-from motion techniques incorporate knowledge of the camera's trajectory along with the sequence of the detected objects in the camera images to calculate where an object is in 3-dimensional space, in a similar manner as stereoscopic reprojections utilize the relative distance between cameras to calculate the depth of an object. In one embodiment of the present invention, estimating position includes acquiring depth information from one camera by capturing images at different times and positions with knowledge of the self-navigating vehicle's trajectory information. This depth information is applied to the specific moving objects identified above to determine their positions (i.e., with respect to either the local frame of reference or a navigation frame) for purposes of collision avoidance. Thus, in one embodiment, the method proceeds to 470 with altering a course of the self-navigating vehicle based on the position information.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system for detecting moving objects from a mobile vehicle, the system comprising:
   an imaging camera;
   a navigation unit including at least an inertial measurement unit;
   a computer system coupled to the image camera and the navigation unit;
   wherein the computer system executes an airborne-object detection process algorithm, and calculates a transformation between two or more image frames captured by the imaging camera using navigation information associated with each of the two or more image frames to generate a motion compensated background image sequence;

wherein the computer systems projects at least one image frame of the two or more images frames into a target image frame selected from the two or more image frames; and wherein the computer system detects moving objects from the motion compensated background image sequence by detecting differences between overlapping portions of the motion compensated background image sequence; and a guidance or flight control system coupled to the computer system, wherein the guidance or flight control system makes adjustments to a trajectory based on information regarding moving objects detected from the motion compensated background image sequence.

2. The system of claim 1, further comprising a laser range finder coupled to the computer system, the laser range finder providing a distance measurement to one or more detected objects.

3. The system of claim 1, wherein the computer system outputs a state vector for each moving object identified from the motion compensated background image sequence, wherein the state vector describes at least an estimated position.

4. The system of claim 3, wherein the state vector further describes a velocity vector, and a distance.

5. The system of claim 4, wherein the state vector is estimated using at least one of a Particle Filter, an Extended Kalman Filter or an Unscented Kalman Filter.

6. The system of claim 1, wherein the computer tracks one or more of the moving objects using at least one of a Particle Filter, an Extended Kalman Filter or an Unscented Kalman Filter.

7. The system of claim 1, the navigation unit further including a navigation system providing global navigation frame trajectory information to the computer system; and wherein the computer estimates a position relative to a navigation frame for one or more moving objects identified from the motion compensated background image sequence based on the trajectory information.

8. The system of claim 1, wherein the guidance or flight control system introduces artificial trajectory excitations.

9. The system of claim 1, wherein the computer system processes one or more local patches of neighboring image segments to identify background motion for static objects located closer than virtual infinity.

10. The system of claim 1, wherein the computer system varies a frame rate of image frames captured by the imaging camera based on clutter identified in a motion compensated background image sequence.

11. An airborne detection system for an aircraft, the airborne detection system comprising:

an imaging camera;

an inertial measurement navigation unit generating navigation information;

a computer system coupled to receive information from the image camera, the inertial measurement navigation unit;

a global navigation satellite system receiver providing trajectory information to the computer system; and a flight controller coupled to the computer;

wherein the computer system, based on an airborne-object detection process algorithm, calculates a transformation between two or more image frames captured by the imaging camera using navigation information associated with each of the two or more image frames to generate a motion compensated background image sequence;

wherein the computer system detects moving objects from the motion compensated background image sequence by detecting differences between overlapping portions of the motion compensated background image sequence and is configured to determine position information for moving objects detected from the motion compensated background image sequence; and wherein the flight controller is configured to alter a flight course for the aircraft based on the position information.

12. The system of claim 11, wherein the transformation is computed using one or more of a fundamental matrix, an essential matrix, or quarternion math.

13. The system of claim 11, wherein the computer system projects at least a first image frame into a target image frame to generate the motion compensated background image sequence.

14. The system of claim 11, wherein computer system detects moving objects from the motion compensated background image sequence based on images of objects appearing more than once in the motion compensated background image sequence.

15. The system of claim 11, wherein the computer outputs a state vector to the flight controller for each moving object identified from the motion compensated background image sequence, wherein the state vector describes at least an estimated position, a velocity vector, and a distance.

16. The system of claim 11, wherein the computer system compensates for static objects appearing in the motion compensated background image sequence located closer than apparent infinity.

17. A non-transitory computer readable media device having computer-executable instructions for a method for image based moving object detection, the method comprising:

capturing two or more images of surrounding scenes around a self-navigating vehicle;

measuring navigation information associated with the two or more images using inertial sensors;

calculating, using a computer system, a first transformation between a first image frame and a second image frame of the two or more image frames, using the navigation information associated with the two or more images;

generating a motion compensated background image sequence based on applying the first fundamental matrix to project the first image frame into the second image frame;

detecting moving objects from the motion compensated background image sequence by detecting differences between overlapping portions of the motion compensated background image sequence;

estimating a position information for moving objects around the self-navigating vehicle based on the motion compensated background image sequence and the navigation information.

18. The computer readable media device of claim 17, the method further comprising:

introducing artificial trajectory excitations to the course of the self-navigating vehicle.

19. The computer readable media device of claim 17, the method further comprising:

tracking detected airborne objects; and providing an estimate of a one or both of a motion velocity vector and a time to collision for the detected airborne objects.

* * * * *